United States Patent
Drochon et al.

(10) Patent No.: US 6,883,609 B2
(45) Date of Patent: Apr. 26, 2005

(54) PERMEABLE CEMENTS

(75) Inventors: Bruno Drochon, Noisy le Grand (FR); Pierre Maroy, Saint Galmier (FR)

(73) Assignee: Schlumberger Technology Corporation, Sugar Land, TX (US)

(*) Notice: Subject to any disclaimer, the term of this patent is extended or adjusted under 35 U.S.C. 154(b) by 74 days.

(21) Appl. No.: 10/276,186

(22) PCT Filed: May 11, 2001

(86) PCT No.: PCT/EP01/05507

§ 371 (c)(1),
(2), (4) Date: Mar. 25, 2003

(87) PCT Pub. No.: WO01/87796

PCT Pub. Date: Nov. 22, 2001

(65) Prior Publication Data

US 2003/0168215 A1 Sep. 11, 2003

(30) Foreign Application Priority Data

May 15, 2000 (FR) ............................. 00 06171

(51) Int. Cl.$^7$ .............................................. E21B 43/02
(52) U.S. Cl. ....................... 166/292; 166/276; 166/277
(58) Field of Search .................................. 166/276, 277, 166/292, 293; 106/672, 676, 681, 816, 819

(56) References Cited

U.S. PATENT DOCUMENTS

| | | | |
|---|---|---|---|
| 4,883,125 A | * | 11/1989 | Wilson et al. ............... 166/291 |
| 5,339,902 A | * | 8/1994 | Harris et al. ................ 166/293 |
| 5,358,047 A | * | 10/1994 | Himes et al. ............. 166/280.1 |
| 5,529,123 A | * | 6/1996 | Carpenter et al. ........... 166/293 |
| 5,897,699 A | * | 4/1999 | Chatterji et al. ............. 106/678 |
| 6,626,991 B1 | * | 9/2003 | Drochon et al. ............. 106/672 |

FOREIGN PATENT DOCUMENTS

EP 0814067 A1 * 12/1997

OTHER PUBLICATIONS

Bentz, et al. "Effects of particle size distribution on performance properties of Portland cement based materials" 1999 Cement and Concrete Research 29 (1999) 1663–1671.*

* cited by examiner

*Primary Examiner*—John Kreck
(74) *Attorney, Agent, or Firm*—Thomas O. Mitchell; Robin Nava; Brigitte L. Echols

(57) ABSTRACT

The present invention concerns a cement slurry with high permeability and good compressive strength, comprising a solid fraction constituted by: 35% to 80% (by volume) of particles with a mean size in the range 100 microns ($\mu$) to 800$\mu$; 0% to 15% (by volume) of particles with a mean particle diameter in the range 0.1 microns to 10 microns; and 10% to 40% (by volume) of particles with a mean particle diameter in the range 20$\mu$ to 50$\mu$; a fraction of said-solid particles being constituted by a cement, and preferably a further fraction by self-destructive particles; a liquid fraction in a water/solid ratio in the range 38% to 50% by volume; and a percentage of cells, provided by a gas or a liquid which is not miscible with water, in the range 30% to 60% of the final volume of the slurry.

11 Claims, No Drawings

PERMEABLE CEMENTS

The present invention relates to techniques for drilling oil, gas, water, geothermal, or like wells. More precisely, the invention relates to permeable cements, to a method of producing such cements, and to the application of said cements to oil wells or the like.

After drilling an oil well or the like, the annular space surrounding the casing is generally cemented. Such an operation is intended to consolidate the well, to protect the casing by passivation and also, essentially, to isolate geological layers so as to prevent fluid exchange between the various formation layers, where such exchange is made possible by the path formed by the drilled hole. The cementing operation is also intended to prevent gas from rising via the annular space and to limit the ingress of water into the production well.

Good isolation is thus the primary objective of the majority of cementing operations carried out in oil wells or the like. However, situations arise wherein it is desired only to reinforce the casing or the geological formations that are traversed. This is particularly the case with cementing operations carried out in a reservoir and which need to be followed by perforation in order to re-establish fluid circulation between the reservoir and the well.

U.S. Pat. No. 3,429,373 describes a permeable cement used to retain the sand produced by a reservoir, in particular in poorly consolidated subterranean formations. That document—and the various improvements described, for example, in U.S. Pat. Nos. 3,646,998, 3,654,990, 3,654,991, 3,654,992, 3,768,561, 3,861,467, 3,861,467, 3,862,663, and 3,948,672—describe a mixture of sand, cement and water which is suspended in a hydrocarbon for injection into the formation to be treated and which is retained in the zone to be treated while the cement sets. In such formulations, the amount of cement is small compared with the other solids, and in particular the external matrix is formed by hydrocarbons, meaning that the mechanical strength of the whole formulation is very low. The purpose is clearly not that of reinforcing the casing or the walls of a reservoir.

Hydrocarbons are also pollutants and are banned by law in many regions. A suspension in a hydrocarbon is not a cement slurry and in any case is not intended to reinforce the casing or the walls of a reservoir. This is supported by the very small amount of cement which is added, 7% to 25% by weight relative to the solids, which does not provide the set cement with high mechanical strength.

U.S. Pat. No. 5,339,902 describes a means for producing permeable cement by simply foaming a conventional cement slurry with 54% to 74% by volume of water in the slurry. Permeability is obtained by means of an extreme foam quality. The quality of a foam or emulsion is defined as the ratio of the volume of the dispersed phase under certain pressure and temperature conditions to the total volume of foam or emulsion under the same conditions. That method, which is rarely employed, leads to low compressive strengths (0.3 megapascals (MPa) in 24 hours and 1.1 MPa in 4 days), which are wholly inadequate when reinforcing casings or geological formations traversed by the well.

Finally, Russian patent RU 2019689 describes fitting a well by replacing a portion of a casing with a filter having pores which are obstructed by plugs that are soluble in an acid, and cementing the annular space between the filter and the wall of the well with a cement including polyvinyl chloride particles which are destroyed by heat after the cement has set.

The aim of the present invention is to provide a method of producing a permeable cement with sufficient compressive strength to be able to contribute to reinforcement. These very particular properties can be achieved simultaneously due to the open pore structure of the cement and to the structure of the solid portion of the permeable cement.

Thus the invention provides a cement slurry comprising:

a solid fraction constituted by 35% to 80% (by volume) of particles with a mean diameter in the range 100 microns ($\mu$) to 800$\mu$; 0% to 15% (by volume) of particles with a mean particle diameter in the range 0.1 microns to 10 microns; and 10% to 40% (by volume) of particles with a mean particle diameter in the range 20$\mu$ to 50$\mu$; a fraction of said solid particles being constituted by a cement;

a liquid fraction in a water/solid ratio in the range 38% to 50% by volume; and a percentage of cells, provided by a gas or a liquid which is not miscible with water, in the range 30% to 60% of the final volume of the slurry.

In a particularly preferred variation of the invention, a fraction of the solid particles is constituted by particles which are destroyed during or after cement settings. The idea is to create cells in a cement slurry containing coarse particles. To this end, it can either be pre-foamed or the slurry or the paste can be emulsified with a fluid which is not miscible with water. Once the cement has set, these cells are then interconnected in part only. Almost complete interconnection is achieved by destruction of coarse particles connecting the cells. Suitable coarse particles include cenosphere type particles wherein destruction is brought on by the chemical environment in the setting of the cement and by temperature. Under these conditions, after the cement has set, it is possible to obtain a compressive strength of more than 3.4 MPa (500 pounds per square inch, psi) and a water permeability of more than 1 Darcy.

The invention has many applications both in the petroleum industry and in the civil engineering or construction industry. Some non-limiting examples which can be cited are:

In the oil well repair field:

Replacing portions of the reservoir behind the casing which have disintegrated over time and by fluid circulation. This often occurs when the well produces water from the reservoir or from another geological layer which is poorly isolated from the reservoir (crossflow). The operation, which consists of filling the void left behind the casing by the disintegrated rock with a porous high-strength material that can resist the pressure drop generated by fluid flow, is absolutely vital for carrying out matrix treatment.

Stopping the production of sand from a well. When the reservoir is constituted by sand, which may or may not be consolidated, or by poorly bound sandstone or where the binder can be dissolved by water, erosion due to fluid flow entrains grains of sand. That production of sand can lead to a stoppage in well production. To avoid such a situation, a gravel packing or filter screens are normally installed inside the well to stop the sand. Over time, these can become soiled or blocked with fine particles. Replacing them is difficult and expensive. Using a permeable cement behind the casing can prevent it being necessary to perform this operation.

Simple replacement of the cement behind the casing. This can be carried out with a conventional cement, but then the casing and the new layer of cement needs to be perforated again to re-connect the well to the reservoir, with the risk of the connection not being made if the cement layer is thicker than planned or perforation is not deep enough. Injecting permeable cement costs less and guarantees that connection will be established in all cases.

In the field of new well construction:

When the strength of the formation is sufficient to allow it, the costs related to placing a casing are avoided by carrying out what is known as an uncased or barefoot completion. Sand packing or gravel packing is then installed if the reservoir might produce sand. A pre-perforated blank liner can also be employed. Placing a layer of permeable cement at the surface of the well walls can avoid the need for such operations. Furthermore, when the formation of the reservoir is not sufficiently strong for that type of simplified completion and it would otherwise have been necessary to put a casing into position with cementing between the casing and the well wall, putting the permeable cement of the invention into position can reinforce the sides of the well and can avoid the need for a casing and subsequent perforation thereof.

When completion with a casing is unavoidable because the rock of the reservoir is very poorly consolidated, placing the permeable cement of the invention between the casing and the sides of the well, instead of a conventional cement, can avoid the need for installing gravel packing or sand packing which is very expensive.

In all cases, the novel material of the invention is particularly suitable for non-consolidated or poorly consolidated sand or fissured or faulted rock. Advantageously, it can also be used for reservoir rock rendered fragile by exhaustion of the field. Clearly, these applications are valid for crude oil or gas producing wells, for subterranean gas storage wells, for wells producing water or other fluids, and regardless of whether the cemented portion is vertical, horizontal, or merely inclined. The application to practically horizontal wells is of particular interest.

The formulation contains at least two types of particle (including cement), and preferably 3 or 4 types, with self-destructive particles. The cement can be of any nature, Portland cement which may or may not include pozzolanic material such as blast furnace slag or fly ash or natural materials such as pozzolana or calcined clays. It is also possible to use high-alumina cements also known as Ciment Fondu, plaster, Sorel cement, activated pozzolanic cements or any other hydraulic cement.

The slurry or cement paste includes particles which are destroyed after setting to create the interconnections and thus increase the permeability of the final material. Cells are created in the cement slurry or paste before setting, either by forming a foam or by emulsifying a fluid which is not miscible with water in the slurry or paste.

If all or some of the coarse particles are constituted by cenospheres, the permeability is very significantly increased without altering the compressive strength of the material (see Example 2). This results from a chemical modification of the core of these hollow particles which occurs when the cement sets and thus its kinetics are temperature-dependent. The porosity constituted by the insides of these hollow particles is then liberated, thus substantially increasing the connections between cells.

Among these numerous possibilities, a combination comprising four types of particle, namely a Portland cement, fine particles with a mean size of about 3 microns, hollow cenospheres, and very coarse particles (more than 200 microns) is our generally preferred case. Depending on requirements, different known additives can be added to the slurry or paste, such as dispersing agents, retarding agents or accelerators, or fluid loss control agents. In the case of a Portland cement, when the temperature is over 105° C., silica is added in a proportion of 30% to 50% by weight relative to the cement, as is known in the art to prevent retrogression of compressive strength.

The fine particles can be constituted by a micro-cement when the compressive strength of the porous cement has to be high.

EXAMPLE 1

The properties of a slurry prepared in accordance with the invention are presented and compared with those of a slurry for a conventional foamed system having the same foam quality, namely 40%:

Slurry A: A mixture of powders was prepared. It comprised 30% by volume of haematite particles with a mean size of about 300 microns; 30% by volume of silica with a mean size of 300 microns; 30% by volume of class G Portland cement and 10% by volume of a Portland/slag micro-cement with a mean size of about 3 microns.

Water and a polynaphthalene sulfonate-based superplasticizer in an amount of 0.07 gallons per sack of powder was mixed with this powder such that the volume percentage of liquid in the slurry was 40%. It should be noted that a sack of powder is defined by analogy with a sack of cement, one sack being 45.359 kg of mixture. In other words, 1 gps= 0.0834 litres (l) of additive per kg of mixture.

Slurry B (reference): This slurry corresponded to the prior art. It comprised a class G cement and water such that the density of the slurry was 1900 kg/m$^3$ (15.8 pounds per gallon, ppg).

These two slurries were foamed using the same procedure, after adding surfactants (D139—a mixture of polyglycols, oxyalkylates and methanol; and F052.1—ethoxysulphonate surfactants in solvents) in an amount of 0.084 gallons per sack of powder (0.007 l/kg), to obtain a foam quality of 40% (i.e., the volume of the foam represented 40% of the final volume of the foamed slurry).

| Slurry | A (invention) | B (reference) |
|---|---|---|
| Porosity before foaming | 40% | 59% |
| Foam quality | 40% | 40% |
| Compressive strength, MPa (psi) | 5.17 (750) | 5.93 (860) |
| Water permeability (Darcy) | 0.150 | 0.008 |

The compressive strength and water permeability were measured using samples which were left at ambient temperature and at atmospheric pressure for 48 hours (h) then oven dried at 85° C. for 5 days. The compressive strength is expressed in MPa, with pounds per square inch (psi) in brackets.

EXAMPLE 2

The properties of two slurries prepared in accordance with the invention, one without destructive particles, the other with destructive particles, are presented and compared:

Slurry A: A mixture of powders was prepared. It comprised 30% by volume of haematite particles with a mean size of about 300 microns; 30% by volume of silica with a mean size of 300 microns; 30% by volume of class G Portland cement and 10% by volume of a Portland/slag micro-cement with a mean size of about 3 microns.

Water and a polynaphthalene sulfonate-based superplasticizer in an amount of 0.07 gallons per sack of powder (0.006 l/kg) was mixed with this powder such that the volume percentage of liquid in the slurry was 40%.

Slurry C: A mixture of powders was prepared. It comprised 30% by volume of haematite particles with a mean size of about 300 microns; 30% by volume of hollow cenospheres with a mean size of 180 microns; 30% by volume of class G Portland cement and 10% by volume of a Portland/slag micro-cement with a mean size of about 3 microns.

Water and a polynaphthalene sulfonate-based superplasticizer in an amount of 0.07 gallons per sack of powder (0.006 l/kg) was mixed with this powder such that the volume percentage of liquid in the slurry was 40%.

These two slurries were foamed using the same procedure, after adding surfactants (D139 and F052.1) in an amount of 0.084 gallons per sack of powder (0.007 l/kg), to obtain a foam quality of 40% (i.e., the volume of the foam represented 40% of the final volume of the foamed slurry).

| Slurry | A (invention) | C |
|---|---|---|
| Porosity before foaming | 40% | 40% |
| Compressive strength, MPa (psi) | 5.17 (750) | 5.59 (810) |
| Water permeability (Darcy) | 0.150 | 1.2 |

The compressive strength and water permeability were measured using samples which were left at ambient temperature and at atmospheric pressure for 48 h then oven dried at 85° C. for 5 days.

EXAMPLE 3

The properties of five slurries prepared in accordance with the invention but foamed with different foam qualities are presented and compared:

Basic slurry: A mixture of powders was prepared. It comprised 30% by volume of haematite particles with a mean size of about 300 microns; 30% by volume of hollow spheres with a mean size of 180 microns; 30% by volume of class G Portland cement and 10% by volume of a Portland/slag micro-cement with a mean size of about 3 microns.

Water and a polynaphthalene sulfonate-based superplasticizer in an amount of 0.07 gallons per sack of powder (0.006 l/kg) was mixed with this powder such that the volume percentage of liquid in the slurry was 40%.

Surfactants were added to the basic slurry and the slurries were foamed to obtain a foam quality of 30% to 50%. It should be remembered that a foam quality of 30% means that the foam volume represents 30% of the final volume of the slurry.

| Slurry | C1 | C2 | C3 | C4 | C5 |
|---|---|---|---|---|---|
| Porosity before foaming | 40% | 40% | 40% | 40% | 40% |
| Foam quality | 30% | 35% | 40% | 45% | 50% |
| Compressive strength, MPa (psi) | 8.27 (1200) | 6.90 (1000) | 5.59 (810) | 4.48 (650) | 2.83 (410) |
| Water permeability (Darcy) | 0.0045 | 0.160 | 1.2 | 6.1 | >12 |

The compressive strength and water permeability were measured using samples which were left at ambient temperature and at atmospheric pressure for 48 h then oven dried at 85° C. for 5 days.

EXAMPLE 4

The properties of two slurries prepared in accordance with the invention, both containing self-destructive particles but with coarse particles of differing size and nature, are presented and compared:

Slurry C: A mixture of powders was prepared. It comprised 30% by volume of haematite particles with a mean size of about 300 microns; 30% by volume of hollow cenospheres with a mean size of 180 microns; 30% by volume of class G Portland cement and 10% by volume of a Portland/slag micro-cement with a mean size of about 3 microns.

Water and a polynaphthalene sulfonate-based superplasticizer in an amount of 0.07 gallons per sack of powder (0.006 l/kg) was mixed with this powder such that the volume percentage of liquid in the slurry was 40%.

Slurry D: A mixture of powders was prepared. It comprised 30% by volume of calcium carbonate particles with a mean size of about 500 microns; 30% by volume of hollow cenospheres with a mean size of 180 microns; 30% by volume of class G Portland cement and 10% by volume of a Portland/slag micro-cement with a mean size of about 3 microns.

Water and a polynaphthalene sulfonate-based superplasticizer in an amount of 0.07 gallons per sack of powder (0.006 l/kg) was mixed with this powder such that the volume percentage of liquid in the slurry was 40%.

These two slurries were foamed using the same procedure, after adding surfactants (D139 and F052.1) in an amount of 0.084 gallons per sack of powder (0.007 l/kg), to obtain a foam quality of 35% (i.e., the volume of the foam represented 35% of the final volume of the foamed slurry).

| Slurry | C | D |
|---|---|---|
| Porosity before foaming | 40% | 40% |
| Compressive strength | 6.90 (1000) | 5.79 (840) |
| Water permeability (D) | 0.160 | 0.270 |

The compressive strength and water permeability were measured using samples which were left at ambient temperature and at atmospheric pressure for 48 h then oven dried at 85° C. for 5 days.

What is claimed is:

1. A cement obtained after setting a slurry comprising:
    a solid fraction constituted by:
        35% to 80% (by volume) of particles with a size in the range $100\mu$ to $800\mu$;
        0% to 15% (by volume) of particles with a diameter in the range $0.1\mu$ to $10\mu$; and
        10% to 40% (by volume) of particles with a diameter in the range $20\mu$ to $50\mu$;
    a fraction of said solid particles being constituted by a cement;
    a liquid fraction in a water/solid ratio in the range 38% to 50% by volume;
    a percentage of cells, provided by a gas or a liquid which is not miscible with water, in the range 30% to 60% of the final volume of the slurry.
said cement having a compressive strength of more than 3.4 MPa and a water permeability of more than 1 Darcy.

2. The cement of claim 1, whereby the solid fraction of the cement slurry comprises haematite particles.

3. The cement of claim 1, whereby a portion of the solid particles is constituted by particles having a structure that is destroyed during the setting of the cement.

4. The cement of claim 3, whereby said portion of the solid particles constituted by particles having a structure that is destroyed during the setting of the cement comprises hollow spheres originating from cenospheres.

5. The cement of claim 4, whereby a portion of the solid particles is constituted by calcium carbonate particles.

6. The cement of claim 1 whereby the part of the solid fraction constituted by particles in the range $0.1\mu$ to $10\mu$ is a micro-cement or a micro-cement/slag mixture.

7. A method of remedial treatment of voids behind casing in a borehole, with a cement having after setting a compressive strength of more than 3.4 MPa and a water permeability of more than 1 Darcy, said method comprising pumping a cement slurry into the void and allowing it to set, the cement slurry comprising:
- a solid fraction constituted by:
  - 35% to 80% (by volume) of particles with a size in the range $100\mu$ to $800\mu$;
  - 0% to 15% (by volume) of particles with a diameter in the range $0.1\mu$ to $10\mu$; and
  - 10% to 40% (by volume) of particles with a diameter in the range $20\mu$ to $50\mu$;
- a fraction of said solid particles being constituted by a cement;
- a liquid fraction in a water/solid ratio in the range 38% to 50% by volume; and
- a percentage of cells, provided by a gas or a liquid which is not miscible with water, in the range 30% to 60% of the final volume of the slurry.

8. A method of completing a well, with a cement having after setting a compressive strength of more than 3.4 MPa and a water permeability of more than 1 Darcy, said method comprising pumping a cement slurry into an annulus around a casing, screen or slotted liner placed in a well and allowing it to set, the cement slurry comprising:
- a solid fraction constituted by:
  - 35% to 80% (by volume) of particles with a size in the range $100\mu$ to $800\mu$;
  - 0% to 15% (by volume) of particles with a diameter in the range $0.1\mu$ to $10\mu$; and
  - 10% to 40% (by volume) of particles with a diameter in the range $20\mu$ to $50\mu$;
- a fraction of said solid particles being constituted by a cement;
- a liquid fraction in a water/solid ratio in the range 38% to 50% by volume; and
- a percentage of cells, provided by a gas or a liquid which is not miscible with water, in the range 30% to 60% of the final volume of the slurry.

9. A method preventing sand production from an underground formation into a well, with a cement having after setting a compressive strength of more than 3.4 MPa and a water permeability of more than 1 Darcy, said method comprising pumping a cement slurry into a region adjacent the formation and allowing it to set, the cement slurry comprising:
- a solid fraction constituted by:
  - 35% to 80% (by volume) of particles with a size in the range $100\mu$ to $800\mu$;
  - 0% to 15% (by volume) of particles with a diameter in the range $0.1\mu$ to $10\mu$; and
  - 10% to 40% (by volume) of particles with a diameter in the range $20\mu$ to $50\mu$;
- a fraction of said solid particles being constituted by a cement;
- a liquid fraction in a water/solid ratio in the range 38% to 50% by volume; and
- a percentage of cells, provided by a gas or a liquid which is not miscible with water, in the range 30% to 60% of the final volume of the slurry.

10. A method of replacing eroded cement behind a casing in a well, with a cement having after setting a compressive strength of more than 3.4 MPa and a water permeability of more than 1 Darcy, said method comprising pumping a cement slurry into the region of the eroded cement and allowing it to set, the cement slurry comprising:
- a solid fraction constituted by:
  - 35% to 80% (by volume) of particles with a size in the range $100\mu$ to $800\mu$;
  - 0% to 15% (by volume) of particles with a diameter in the range $0.1\mu$ to $10\mu$; and
  - 10% to 40% (by volume) of particles with a diameter in the range $20\mu$ to $50\mu$;
- a fraction of said solid particles being constituted by a cement;
- a liquid fraction in a water/solid ratio in the range 38% to 50% by volume; and
- a percentage of cells, provided by a gas or a liquid which is not miscible with water, in the range 30% to 60% of the final volume of the slurry.

11. A method of selectively producing oil from an oil and water producing formation, comprising pumping a cement slurry into or adjacent to a producing formation, allowing the cement to set so that the cement achieves a compressive strength of more than 3.4 MPa and a water permeability of more than 1 Darcy, so as to produce fluid from the reservoir with an oil water ratio higher than would normally be possible from an untreated formation, the cement slurry comprising:
- a solid fraction constituted by:
  - 35% to 80% (by volume) of particles with a size in the range $100\mu$ to $800\mu$;
  - 0% to 15% (by volume) of particles with a diameter in the range $0.1\mu$ to $10\mu$; and
  - 10% to 40% (by volume) of particles with a diameter in the range $20\mu$ to $50\mu$;
- a fraction of said solid particles being constituted by a cement;
- a liquid fraction in a water/solid ratio in the range 38% to 50% by volume; and
- a percentage of cells, provided by a gas or a liquid which is not miscible with water, in the range 30% to 60% of the final volume of the slurry.

* * * * *